United States Patent
Gaggini

(10) Patent No.: US 6,699,415 B1
(45) Date of Patent: Mar. 2, 2004

(54) SURFACES OF TRANSPARENT RESIN IN WHICH MARBLE OR OTHER STONES ARE EMBEDDED

(76) Inventor: Silena Gaggini, Via Peschiera 1, 56038 Ponsacco, Pisa (IT)

(*) Notice: Subject to any disclaimer, the term of this patent is extended or adjusted under 35 U.S.C. 154(b) by 0 days.

(21) Appl. No.: 09/913,011
(22) PCT Filed: Feb. 7, 2000
(86) PCT No.: PCT/IT00/00036
  § 371 (c)(1), (2), (4) Date: Aug. 8, 2001
(87) PCT Pub. No.: WO00/47427
  PCT Pub. Date: Aug. 17, 2000

(30) Foreign Application Priority Data

Feb. 9, 1999  (IT) .......................................... FI99A0028

(51) Int. Cl.⁷ ............................ B32B 31/00; B44C 3/17; E04F 13/08
(52) U.S. Cl. ...................... 264/139; 428/143; 428/149; 428/150; 427/195; 427/198; 427/289; 427/368; 264/73; 264/74; 264/162; 264/138; 264/245; 264/246; 264/247; 52/315; 52/309.14
(58) Field of Search ................. 428/143, 149, 428/150; 52/315, 309.14; 427/195, 198, 289, 368; 264/73, 74, 162, 139, 138, 245, 246, 247

(56) References Cited

U.S. PATENT DOCUMENTS 3,170,808 A * 2/1965 Almy et al. ................ 156/299
3,324,213 A * 6/1967 Anfinset ........................ 264/71
3,344,011 A * 9/1967 Goozner ..................... 156/242
3,378,617 A * 4/1968 Elmendorf ................. 264/162

FOREIGN PATENT DOCUMENTS

DE    2 300 674       7/1973
EP    0 267 997 A1    5/1988
JP    07100816        4/1995

OTHER PUBLICATIONS

Shikoku Chemical Industries Co. Ltd. 1980 Produce Artificial Stone Plate Floor . . . Database WPI, Section Ch, Week 198024.

Shikoku Chemical Industries Co. Ltd. 1989 Clay Artificial Stone Build Contain . . . Database WPI, Section Ch, Week 198925.

* cited by examiner

Primary Examiner—William P. Watkins, III
(74) Attorney, Agent, or Firm—McGlew and Tuttle, P.C.

(57) ABSTRACT

A process for the production of a manufactured article for coatings, for components of sanitary ware, kitchen fittings, etc., in polymerized transparent resin in which marble and other stones are embedded. The surface of the product is worked by brushing with abrasives, so as to obtain depressions corresponding to the resin, and slight projections with substantially uniform distribution corresponding to the inserts; advantageously, the inserts are "decapitated" to give smoothed surfaces.

6 Claims, 1 Drawing Sheet

SURFACES OF TRANSPARENT RESIN IN WHICH MARBLE OR OTHER STONES ARE EMBEDDED

FIELD OF THE INVENTION

The invention relates to a product with special charactestics, which can be used as a product for coatings, for components of sanitary ware and in kitchen fittings and domestic worktops. This product consists of a polymerized transparent resin—which may be colored—in which inserts consisting of gravel of marble and/or of other stones, which may also be obtained from waste recovered from other processes, preferably rounded, embedded substantially uniformly.

To obtain particular effects, to ensure surface protection of the resin, and for other purposes or advantages, according to the invention it is envisaged that the useful surface of the product should be worked by brushing with abrasives, so as to obtain slight depressions corresponding to the resin, whereas slight projections, distributed substantially uniformly and surrounded by the said depressions, are delineated corresponding to the said inserts.

Advantageously, in one possible embodiment, prior to brushing with abrasives the product is "decapitated" (i.e. machined for uniform removal of a limited thickness) whereby the inserts appear at the surface with smoothed surfaces; the slight projections formed by the inserts remain smoothed, co-planar (flush) and surrounded by the said slight depressions obtained by brushing.

Brushing can be followed by a surface polishing treatment of the resin and of the inserts.

The invention also relates to a product for coatings, for components of sanitary ware and kitchen fittings and for domestic worktops, consisting of a polymerized transparent resin—which may also be more or less colored—in which inserts consisting of gravel of marble and/or other stones, even obtained from waste recovered from other processes, are embedded substantially uniformly. This product according to the invention is characterized in that there are slight projections corresponding to the inserts, and slight depressions corresponding to the resin, on the useful surface of the said product.

Advantageously, the inserts may be smoothed at the surface (as a result of the "decapitation" machining), so that the projections become smoothed and coplanar (flush) and surrounded by the said slight depressions.

BRIEF DESCRIPTION OF THE DRAWINGS

The invention will be better understood by following the description and the appended drawing, which shows a practical, non-limitative example of the said invention. In the drawing.

DESCRIPTION OF THE PREFERRED EMBODIMENT

As illustrated in the accompanying drawing, using a technique that is already known (as described in another previous Italian patent application filed on 19.03.1995 No. FI/96/A/54 by the same applicant), a conglomerate is formed from a transparent, and possibly colored, synthetic resin 1, and a number of inserts 3 that are embedded in the resin and are in the form of gravel or other stone material, either natural, or possibly obtained from waste from previous processing, for example by treatment of fragments from previous processing to obtain the rounded shapes that are assumed in nature by gravel that is moved naturally by the water of stretches of water; the resin is then polymerized. The polymerized resin is sufficiently transparent or completely transparent, so that the inserts 3 can be seen through the thickness of the said resin.

Figure 1:
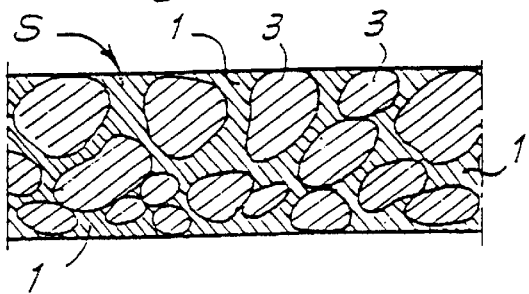
FIG. 1 shows a starting product that is to be processed according to the invention.

The surface obtained with the product of the aforementioned type, as illustrated in FIG. 1, has a surface S that is intended to be seen, which is normally geometrically flat. A flat surface as stated above offers an appearance that is very uniform and so has characteristics that are not always acceptable. Moreover, as the surface S consists almost entirely of the polymerized resin 1, its resistance to mechanical wear and to stresses of the thermal type—for example caused by placing metallic cooking utensils thereon, which are at a relatively high temperature—does not offer the stability that should preferably be offered by surfaces that are to be used in the domestic situation, for example surfaces of kitchen worktops or surfaces in living rooms etc.

Figure 2:
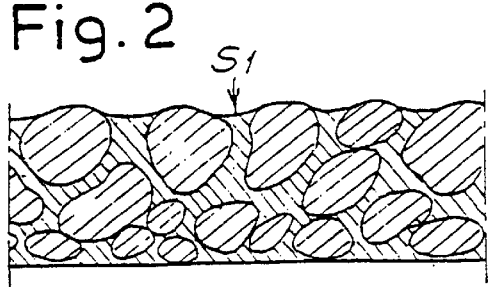
FIG. 2 shows the product from FIG. 1, processed by simple abrasion and brushing.

According to the invention, it is proposed to treat the surface S by brushing more or less intensively with abrasives of successively increasing fineness, so as to obtain wear of the uncovered surface of the resin whereas the inserts offer greater resistance; therefore after treatment the surface S1, as shown in FIG. 2, has become undulating through the effect of wear of the resin zones and the greater resistance that is offered by the structure (which remains practically unchanged) of the surface inserts embedded in the resin. In consequence, the surface S1 is defined by the projecting portions represented by the surfaces of the inserts coming to the surface and by zones where there are slight depressions and undulation, which are formed by the resin, which accordingly does not come into direct contact with any objects that are placed on the product that has been treated in this way.

According to a further development of the invention, the starting product shown in FIG. 1 is first worked by removing a thickness X (so-called "decapitation") which gives rise to the formation of a flat surface S10 (FIG. 3); this surface S10 consists partly of the resin and partly of the stone material of the inserts that was worn away together with the resin, and which therefore forms surfaces I that are substantially flat, flush, and appearing on surface S10. In this case too, after the process of removal of a thickness X, i.e. after the so-called "decapitation" of the surface inserts—shown as 13 in FIG. 3—brushing with abrasives is carried out as already indicated for the processing as in FIG. 2; therefore the final surface consists (FIGS. 4 and 6) of the zones I of the "decapitated" inserts 13 and the surfaces S13 forming slight depressions that are connected to the leveled surfaces I and have a slightly rounded periphery. In this case as well, objects placed on the final surface of the treated product rest on the zones I represented by the material of the stone inserts 13, whereas the surfaces in the depressions S13 are protected from contact with the objects, which are supported purely by surfaces I.

"Decapitation" tends to lower the percentage of surface created by the resin, so as to increase the resistance to heat, and to wear.

Figure 3:
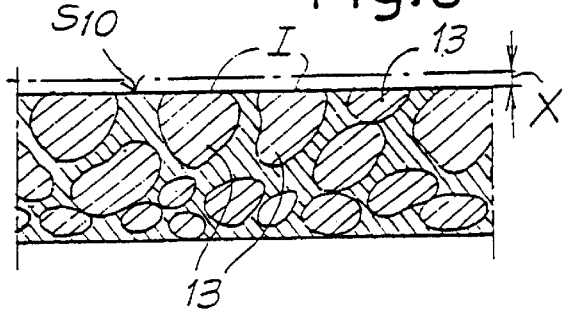
FIGS. 3 and 4 show the product that is first treated by removing a uniform thickness (decapitation) and is then treated by abrasion and brushing according to the invention.
Figure 4:
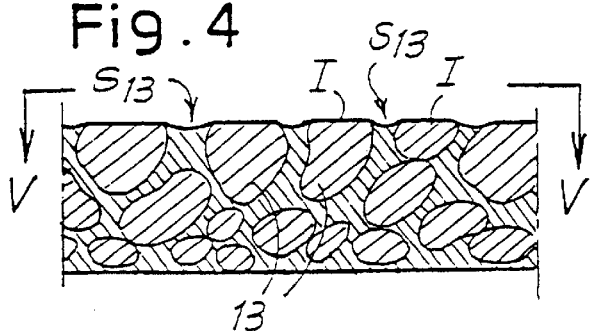
Figure 5:
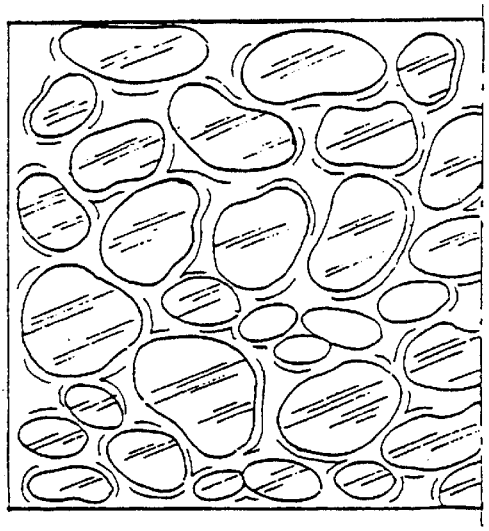
FIG. 5 shows a view along line V—V in FIG. 4.
Figure 6:
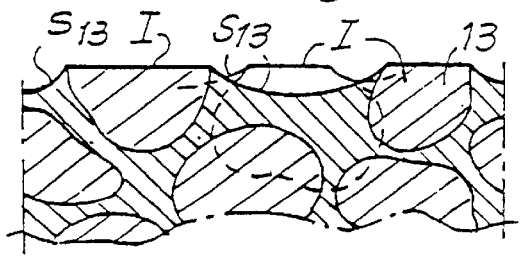
FIG. 6 shows a greatly magnified detail of the product as in FIG. 4.

The slightly undulating appearance of the surfaces obtained by the treatment defined above—and as illustrated in FIG. 2 or in FIGS. 4 and 6—is certainly more pleasant and also differs in other ways from the appearance of a smooth surface such as that consisting of resin completely as designated by S in FIG. 1 or consisting of the surface S10 and the surfaces I of the "decapitated" material 13, as shown in FIG. 3. Conversely, the structure as obtained with reference to FIG. 2 or as obtained with reference to FIGS. 4 and 6 will have a more characteristic and varying appearance, than a surface that is completely and monotonously flat.

As well as the aesthetic advantage described above, there is a functional effect in that the depressions such as those of surface S1 or those of surface S13—formed by the polymerized resin—are protected from wear and from thermal effects that might otherwise be exerted on the resin by the placing, for example, of a cooking vessel or some other object that might be placed thereon for whatever purpose, for example on a kitchen worktop. The projecting surfaces (such as those I or such as those rounded off in FIG. 2), being formed by the stone inserts, are resistant to wear and to heat, and keep their polish for a long time.

The polymerized resin must be transparent or substantially transparent after polymerization, so as to permit the inserts 3 or 13 to be visible, like gravel immersed in clear water. Since these resins may undergo a slight color change over time, the transparent resin can also advantageously be slightly colored at the start, so as to avoid an excessive color change such as can result from yellowing of resin that is purely transparent and colorless when polymerized, some time after manufacture of the product; this possible color change over time is added to the slight initial coloration of the transparent mass of polymerized resin, thus avoiding excessively pronounced differentiation due to the color change that occurs over time.

The drawing shows just one example, given purely as a practical demonstration of the invention, and the said invention can vary in forms and arrangements though without leaving the scope of the concept indicated by the said invention.

What is claimed is:

1. A process for the manufacture of a product for coatings, for components including sanitary ware and kitchen fittings, the components consisting of a polymerized transparent resin, in which inserts consisting of gravel of marble and/or other stones are embedded substantially uniformly, the process comprising:

embedding the inserts in a liquid resin;

polymerizing the liquid resin and then hardening the liquid resin in order to form the useful surface of the product as a rigid structure;

decapitating the rigid structure by removing a limited thickness, so that the inserts appear with leveled surfaces formed by the inserts which are then flush with the surface of the hardened resin forming a flat free surface;

processing the free surface by brushing with abrasives in order to remove superficial parts of the resin, so as to obtain slight depressions corresponding to the resin, whereas, corresponding to the inserts, there are slight projections, distributed substantially uniformly and surrounded by the depressions.

2. A process as in claim 1 in which brushing is followed by a surface polishing treatment of the resin and of the inserts.

3. A process as in claim 1, wherein the polymerized resin is slightly colored.

4. A process for the manufacture of a product, the process comprising:

embedding inserts consisting of gravel of marble and/or other stones in a liquid resin;

polymerizng said liquid resin with the inserts embedded substantially uniformly and then hardening the liquid resin in order to form a rigid structure with a surface;

removing a limited thickness of the surface of the rigid structure so that the inserts have leveled surfaces flush with the surface of the hardened resin forming a flat free surface;

processing the flat free surface by brushing the entire flat free surface with an abrasive to remove portions of the resin and to form depressions in the resin at the flat free surface with the inserts projecting and being surrounded by the depressions.

5. A process as in claim 4, further comprising: surface polishing the resin and of the inserts after said step of brushing.

6. A process as in claim 4, wherein said polymerized resin is slightly colored.

* * * * *